US010001851B2

(12) United States Patent
Sudo et al.

(10) Patent No.: US 10,001,851 B2
(45) Date of Patent: Jun. 19, 2018

(54) ELECTRONIC DEVICE AND DISPLAY METHOD

(71) Applicant: KYOCERA CORPORATION, Kyoto (JP)

(72) Inventors: Tomohiro Sudo, Yokohama (JP); Hideko Murakami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 13/851,876

(22) Filed: Mar. 27, 2013

(65) Prior Publication Data

US 2013/0257772 A1    Oct. 3, 2013

(30) Foreign Application Priority Data

Mar. 28, 2012  (JP) ................. 2012-075142

(51) Int. Cl.
*G06F 3/041*    (2006.01)
*G06F 3/0488*    (2013.01)
*G06F 3/01*    (2006.01)

(52) U.S. Cl.
CPC ............ *G06F 3/0412* (2013.01); *G06F 3/016* (2013.01); *G06F 3/041* (2013.01); *G06F 3/0488* (2013.01); *G06F 2203/04105* (2013.01); *G06F 2203/04806* (2013.01)

(58) Field of Classification Search
CPC .............. G06F 3/0488; G06F 3/04883; G06F 3/04806; G06F 2203/04805; G06F 2203/04808
USPC ................. 345/173, 174, 660, 661; 715/863
See application file for complete search history.

(56) References Cited

U.S. PATENT DOCUMENTS

| | | | |
|---|---|---|---|
| 6,567,102 B2 * | 5/2003 | Kung ............................ 345/660 |
| 7,760,187 B2 * | 7/2010 | Kennedy ....................... 345/173 |
| 7,956,847 B2 * | 6/2011 | Christie ........................ 345/173 |
| 8,243,035 B2 * | 8/2012 | Abe et al. ..................... 345/173 |
| 8,365,074 B1 * | 1/2013 | Wagner et al. ............... 715/702 |
| 8,405,682 B2 | 3/2013 | Machida |
| 8,477,115 B2 | 7/2013 | Rekimoto |
| 8,686,962 B2 * | 4/2014 | Christie ........................ 345/173 |
| 8,970,634 B2 | 3/2015 | Homma et al. |

(Continued)

FOREIGN PATENT DOCUMENTS

| JP | H08-166850 A | 6/1996 |
|---|---|---|
| JP | 2006-345209 A | 12/2006 |

(Continued)

OTHER PUBLICATIONS

An Office Action; "Notice of Reasons for Rejection," issued by the Japanese Patent Office dated Jun. 23, 2015, which corresponds to Japanese Patent Application No. 2012-075142 and is related to U.S. Appl. No. 13/851,876; with English language concise explanation.

(Continued)

*Primary Examiner* — Peter D McLoone
(74) *Attorney, Agent, or Firm* — Studebaker & Brackett PC

(57) ABSTRACT

In order to enable easier magnification and reduction of a displayed image, an electronic device 1 includes a display unit 30, a pressure detection unit 60 and a control unit 10, such that the display unit 30 displays an image, the pressure detection unit 60 detects a pressure, and the control unit 10, based on the pressure detected by the pressure detection unit 60, controls magnification or reduction of the image.

2 Claims, 13 Drawing Sheets

(a)

(b)

(c)

(56) References Cited

U.S. PATENT DOCUMENTS

| | | | |
|---|---|---|---|
| 2002/0180763 A1* | 12/2002 | Kung | 345/660 |
| 2006/0022955 A1* | 2/2006 | Kennedy | 345/173 |
| 2006/0132460 A1* | 6/2006 | Kolmykov-Zotov et al. | 345/173 |
| 2006/0284858 A1 | 12/2006 | Rekimoto | |
| 2007/0188473 A1* | 8/2007 | Anwar | 345/173 |
| 2008/0165141 A1* | 7/2008 | Christie | G06F 3/044 345/173 |
| 2008/0165255 A1* | 7/2008 | Christie | G06F 3/04883 348/207.99 |
| 2009/0160793 A1 | 6/2009 | Rekimoto | |
| 2009/0228791 A1 | 9/2009 | Kim et al. | |
| 2010/0026647 A1* | 2/2010 | Abe et al. | 345/173 |
| 2010/0141684 A1 | 6/2010 | Machida | |
| 2010/0315438 A1* | 12/2010 | Horodezky et al. | 345/661 |
| 2011/0050576 A1* | 3/2011 | Forutanpour | G06F 3/04886 345/168 |
| 2011/0109581 A1 | 5/2011 | Ozawa et al. | |
| 2011/0221694 A1* | 9/2011 | Karaoguz et al. | 345/173 |
| 2011/0239155 A1* | 9/2011 | Christie | 715/784 |
| 2012/0105358 A1* | 5/2012 | Momeyer | G06F 3/0414 345/174 |
| 2012/0147052 A1 | 6/2012 | Homma et al. | |
| 2012/0319968 A1* | 12/2012 | Sakayori | 345/173 |
| 2012/0327126 A1* | 12/2012 | Solismaa | G06F 3/04883 345/661 |
| 2013/0215034 A1* | 8/2013 | Oh et al. | 345/163 |
| 2014/0009413 A1* | 1/2014 | Su et al. | 345/173 |
| 2014/0049564 A1* | 2/2014 | Borger et al. | 345/660 |
| 2014/0104197 A1* | 4/2014 | Khosravy et al. | 345/173 |
| 2014/0118271 A1* | 5/2014 | Lee et al. | 345/173 |

FOREIGN PATENT DOCUMENTS

| | | |
|---|---|---|
| JP | 2007-240964 A | 9/2007 |
| JP | 2008-070968 A | 3/2008 |
| JP | 2009-151505 A | 7/2009 |
| JP | 2009-217801 A | 9/2009 |
| JP | 2010-136187 A | 6/2010 |
| JP | 2010-271774 A | 12/2010 |
| JP | 2011-53974 A | 3/2011 |
| JP | 2011-165023 A | 8/2011 |
| WO | 2008/139551 A1 | 11/2008 |

OTHER PUBLICATIONS

An Office Action; "Decision of Rejection," issued by the Japanese Patent Office dated Dec. 22, 2015, which corresponds to Japanese Patent Application No. 2012-075142 and is related to U.S. Appl. No. 13/851,876; with English language concise explanation.

An Office Action; "Notice of Reasons for Rejection," issued by the Japanese Patent Office dated Sep. 15, 2015, which corresponds to Japanese Patent Application No. 2012-075142 and is related to U.S. Appl. No. 13/851,876; with English language concise explanation.

JP Office Action dated Nov. 15, 2016 from corresponding JP Appl No. 2012-075142, with concise statement of relevance, 13 pp.

* cited by examiner

FIG. 2
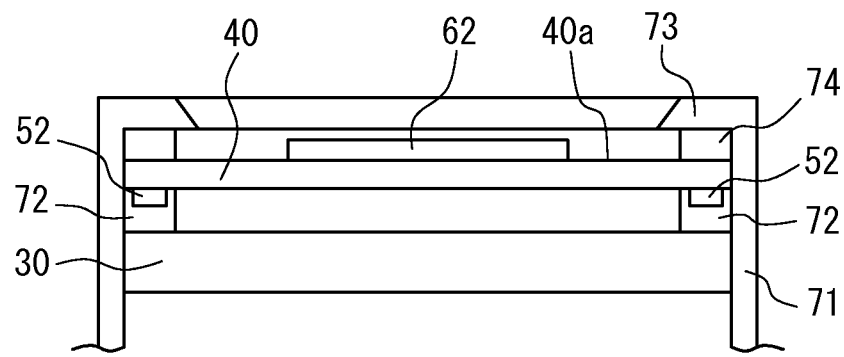
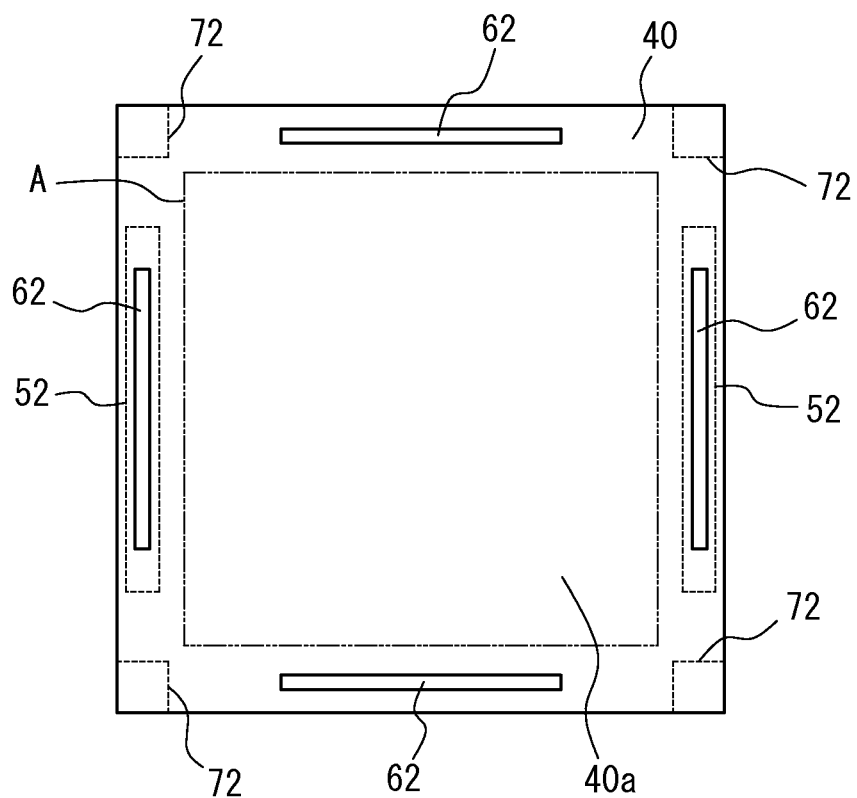

ELECTRONIC DEVICE AND DISPLAY METHOD

CROSS REFERENCE TO RELATED APPLICATION

This application claims priority to and the benefit of Japanese Patent Application No. 2012-075142 (filed on Mar. 28, 2012), the entire content of which is incorporated herein by reference.

FIELD

The embodiments discussed herein relate to an electronic device and a display method for performing predetermined operations based on an input operation.

BACKGROUND

In recent years, electronic devices having touch sensors such as touch panels, touch switches and the like as members for detecting operations by operators have been increasingly used for mobile terminals such as mobile phones. Such electronic devices having the touch sensors are popularly used for, as well as the mobile terminals, equipments such as calculators, ticket vending machines, home electric appliances such as microwaves, TV sets, lighting equipments, industrial equipments (FA equipments) and the like.

There have been proposed intuitive operations, by using the touch sensor, to magnify and reduce a displayed image such as a photograph (see Patent Document 1). Patent Document 1 suggests to detect a plurality of contact points, namely, multi-tap while the image is displayed and to magnify the image by moving away the plurality of contact points from each other or to reduce the image by moving the contact points close to each other.

Patent Document 1: Japanese Patent Laid-Open No. 2008-070968

SUMMARY

In order to perform such a magnification or reduction operation, however, it is necessary to carry out the multi-tap.

Accordingly, in consideration of such a condition, an electronic device and a display method enabling a user to more easily magnify or reduce a displayed image are provided.

In order to achieve the above matters, an electronic device according to one embodiment includes:
a display unit configured to display an image;
a pressure detection unit configured to detect a pressure; and
a control unit configured to control magnification or reduction of the image at a ratio corresponding to the pressure detected by the pressure detection unit.

Preferably, the electronic device further includes:
a contact detection unit configured to detect a contact, wherein
the control unit controls magnification or reduction of the image at a ratio corresponding to the number of contacts detected by the contact detection unit.

Preferably, the electronic device further includes:
a contact detection unit configured to detect a contact, wherein
the control unit detects a shift amount of the contact to the contact detection unit and controls magnification or reduction of the image displayed on the display unit at a ratio corresponding to the shift amount.

Preferably, the electronic device further includes:
a contact detection unit configured to detect a contact, wherein
the control unit detects a shift direction of the contact to the contact detection unit and selects to control magnification or reduction based on the shift direction.

An input reception method, as with another aspect, includes steps of:
displaying an image;
detecting a pressure; and
controlling magnification or reduction of the image based on the detected pressure.

BRIEF DESCRIPTION OF DRAWINGS

FIGS. 2(A) and 2(B) are diagrams illustrating an example of a housing structure of the electronic device;

DESCRIPTION OF EMBODIMENTS

The electronic device and the display method discussed herein enable the user to easily magnify or reduce the displayed image.

Embodiments will be described with reference to the accompanying drawings.

Figure 1:
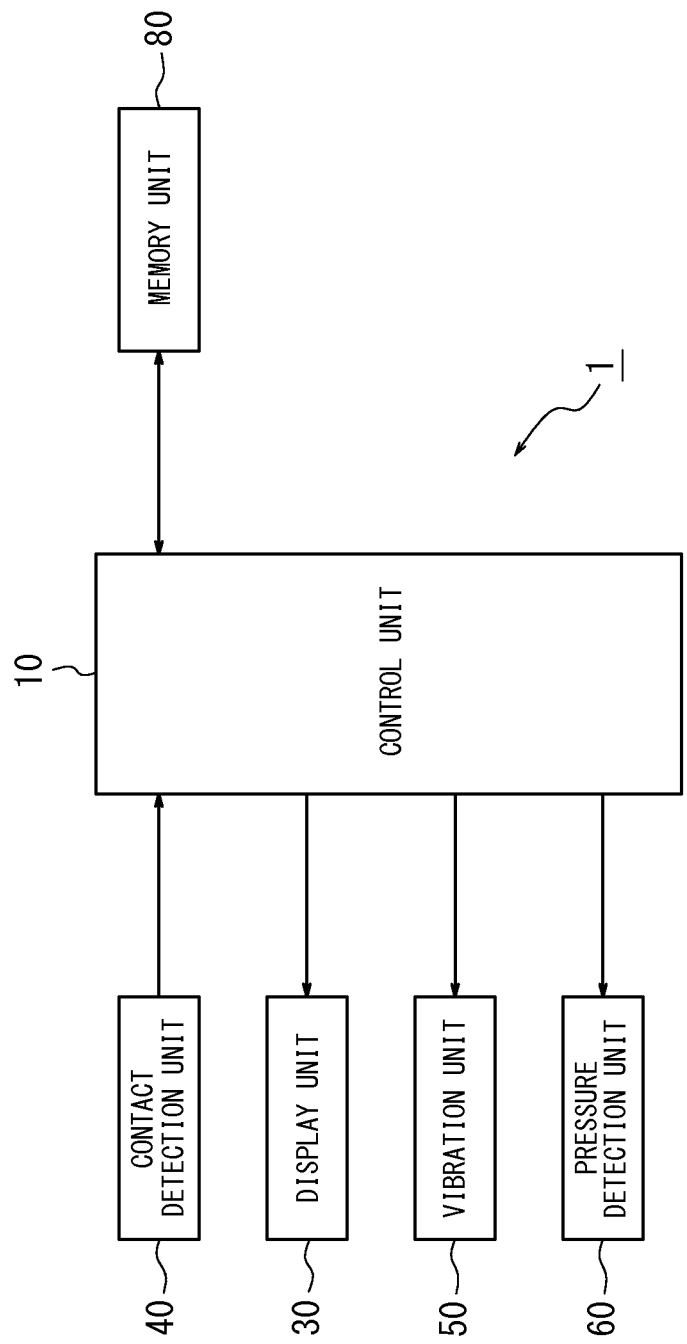
FIG. 1 is a block diagram illustrating a schematic configuration of an electronic device according to one embodiment.

FIG. 1 is a block diagram illustrating a schematic configuration of an electronic device according to a first embodiment of the present invention.

An electronic device 1 according to the present embodiment is a mobile phone terminal, for example, and includes a control unit 10, a display unit 30, a contact detection unit 40, a vibration unit 50, a pressure detection unit 60 and a memory unit 80, as illustrated in FIG. 1.

The control unit 10 controls each function unit of the electronic device 1, thereby controls and manages overall electronic device 1. Operations of the control unit 10 will be described below.

The display unit 30 may display various images including photographs. The display unit 30 displays an image of an object such as, for example, a push button switch (push-type button switch). The object is an image indicating, to an operator, a contact area on a touch face of the contact detection unit 40. The push button switch is a button or a key used for an input operation by the operator (hereinafter, referred to simply as the "key or the like" collectively). The display unit 30 is constituted by using, for example, a liquid crystal display (LCD) panel, an organic EL display panel or the like.

The contact detection unit 40 is normally disposed on a front face of the display unit 30 and detects a contact to the object displayed on the display unit 30 by an operator's finger, a stylus pen and the like (hereinafter, referred to simply as a "contact object" collectively) at a corresponding position on the touch face of the contact detection unit 40. Also, the contact detection unit 40 detects a contact position of the contact object on the touch face and notifies the control unit 10 of the detected contact position. The contact detection unit 40 may include a touch sensor of, for example, a resistive film type, a capacitive type or an optical type.

The vibration unit 50 may include, for example, a piezoelectric vibrator and vibrates the contact detection unit 40. The vibration unit 50 generates vibration in a predetermined vibration pattern such that a tactile sensation is provided to the contact object contacting the touch face. According to the present embodiment, the vibration unit 50 generates vibration based on a driving signal supplied from the control unit 10.

According to the present embodiment, that is, the control unit 10 controls the vibration unit 50 to vibrate. At this time, the control unit 10 may control to change the driving signal for driving the vibration unit 50 based on the contact position of the contact object detected by the contact detection unit 40. That is, the control unit 10 may control such that vibration in a different pattern is generated based on the object displayed on the display unit 30 corresponding to the contact position detected by the contact detection unit 40.

The pressure detection unit 60 detects a pressure on the touch face of the contact detection unit 40 and may include an element such as, for example, a strain gauge sensor or a piezoelectric element whose physical or electric properties (strain, resistance, voltage and the like) changes according to the pressure. When the pressure detection unit 60 is constituted by using, for example, the piezoelectric element or the like, based on a load (force) of the pressure on the touch face of the contact detection unit 40 (or based on a speed (acceleration) of change of the load (force)), the voltage (a value of the voltage (hereinafter, referred to simply as data based on the pressure)) changes as the electric property of the piezoelectric element of the pressure detection unit 60. When the pressure detection unit 60 notifies the control unit 10 of the data based on the pressure or when the control unit 10 detects the data based on the pressure detected by the pressure detection unit 60, the control unit 10 obtains the data based on the pressure. That is, the control unit 10 obtains the data based on the pressure on the touch face of the contact detection unit 40 from the pressure detection unit 60. The data based on the pressure may be, instead of the value of the voltage, a load of the pressure, a value of power, a resistance and the like. Note that the vibration unit 50 and the pressure detection unit 60 may be integrally configured.

The memory unit 80 may include, for example, a flash memory or the like and may store a variety of information as well as various application software (hereinafter, referred to simply as an "application") to be executed by the electronic device 1.

FIG. 2 illustrates diagrams of an example of a housing structure around the display unit 30, the contact detection unit 40, the vibration unit 50 and the pressure detection unit 60. FIG. 2(A) is a cross-sectional view of a main section, and FIG. 2(B) is an elevation view of the main section. As illustrated in FIG. 2(A), the display unit 30 of the electronic device 1 is contained and held in a housing 71. The contact detection unit 40 is disposed on the display unit 30 via insulators 72 made of elastic members. In the electronic device 1, the contact detection unit 40 is held on the display unit 30 via the insulators 72 arranged at four corners outside a display area A of the display unit 30 indicated by chain double-dashed lines in FIG. 2(B). In FIG. 2, the electronic device 1 according to the present embodiment includes the display unit 30 and the contact detection unit 40 which are rectangular in shape in a planar view. However, these units may take different shapes according to conditions such as a configuration of the contact detection unit 40 or the display unit 30 of the electronic device 1.

The housing 71 is provided with an upper cover 73 covering a surface area of the contact detection unit 40 outside the display area of the display unit 30. An insulator 74 made of elastic member is arranged between the upper cover 73 and the contact detection unit 40. The contact detection unit 40 illustrated in FIG. 2 includes a surface member having a touch face 40a constituted by using, for example, a transparent film or the glass, and a rear face member made of glass or acryl. The contact detection unit 40 is designed such that, when the touch face 40a is pressed down, a pushed part is slightly bent (strained) relative to the pressure or a structure itself is slightly bent.

A strain gauge sensor 62 for detecting a pressure applied on the contact detection unit 40 is provided, adhered or the like, on a surface of the touch sensor 40 at a position close to each periphery covered by the upper cover 73. Further, a piezoelectric vibrator 52 for vibrating the contact detection unit 40 is provided, adhered or the like, on the rear face of the touch sensor 40 at a position close to each of two opposing peripheries. That is, the electronic device 1 illustrated in FIG. 2 has the pressure detection unit 60 illustrated in FIG. 1 including four strain gauge sensors 62 and the vibration unit 50 including two piezoelectric vibrators 52. The vibration unit 50 vibrates the contact detection unit 40, thereby the touch face 40a is vibrated. Note that the housing 71, the upper cover 73 and the insulator 74 illustrated in FIG. 2(A) are omitted in FIG. 2(B).

The electronic device 1 having the configuration described above may detect an input based on a contact to, or a pressure on, an object such as the key or the like. For example, the electronic device 1 may detect a simple contact to, a faint pressure, a stronger pressure and a further stronger pressure on the object. Accordingly, input in various manners may be performed to one object.

Also, the electronic device 1 controls the vibration unit 50 to vibrate in response to the input operation to the object such as the key or the like by the operator. Thereby, a pressing sensation of a mechanical key may be provided to the operator. Moreover, the electronic device 1, according to the data based on the pressure, changes a vibration pattern of the vibration unit 50. For example, the electronic device 1, according to the data based on the pressure, controls the vibration unit 50 to vibrate for providing a pressing sensation of a first level of a multi-level mechanical button or for providing a multi-level pressing sensation. Note that, in the following description, pressing causing vibration for providing a pressing sensation of an n-th level (n is a positive integer) to a user is referred to as n-level pressing.

Further, the electronic device 1 has functions to magnify and to reduce a displayed image. The following is a description of the functions to magnify and to reduce the displayed image.

When the operator contacts, namely, taps at any position on the touch face of the contact detection unit 40 while an image to be magnified or reduced is displayed (see FIG. 3(a)), the control unit 10 displays an icon A on the display unit 30 (see FIG. 3(b)). The icon A may be displayed after a predetermined time while the touch face is being tapped. The icon A is displayed in an area on the display unit 30 corresponding to a contact area of the touch face. In the following description, the corresponding area of the touch face for a display position of the icon A is referred to as an icon area, for the sake of convenience.

When the user performs first-level pressing in the icon area, that is, slightly presses the icon area, the electronic device 1 generates vibration corresponding to the first-level pressing and changes to a zoom mode (see FIG. 3(c)). In the zoom mode, the electronic device 1 may magnify or reduce the displayed image. Also, the electronic device 1, after changing to the zoom mode, displays a ratio M of magnification or reduction from an original image on the display unit 30. According to the first embodiment, the electronic device 1 ends the zoom mode when the contact in the icon area is released.

Figure 4:
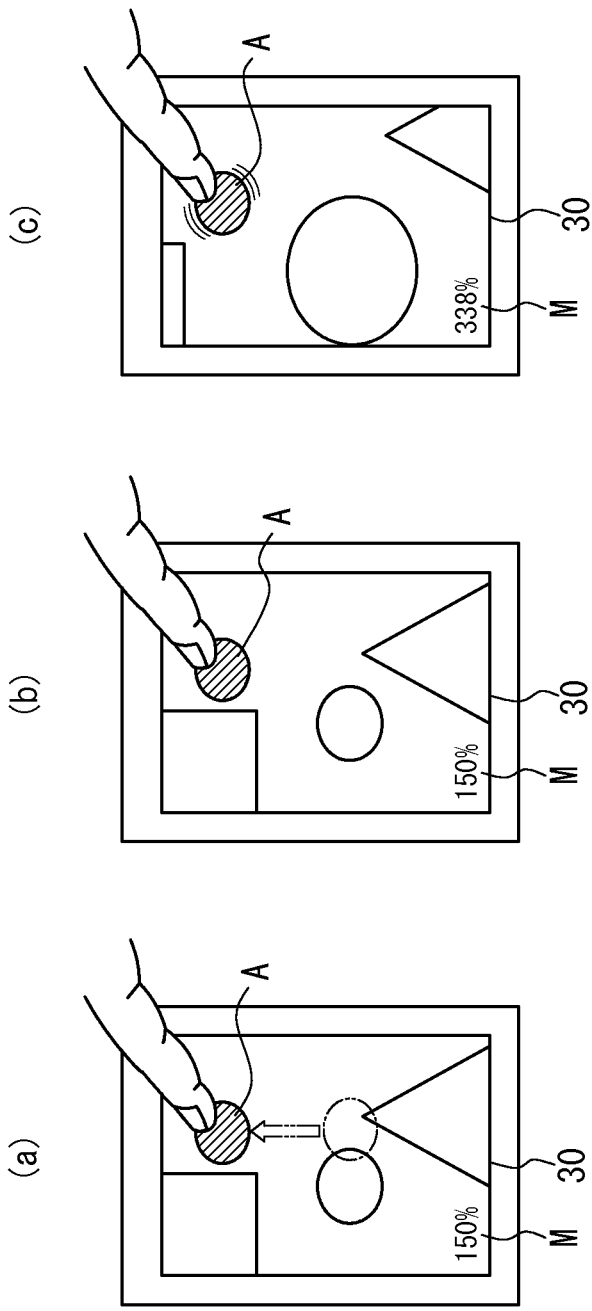
FIGS. 4(a) to 4(c) are diagrams for illustrating a first magnification operation and a second magnification operation according to the first embodiment.

In zoom mode, when the user slides, namely, sweeps the contact position upward, for example, from a state maintaining the contact in the icon area (see FIG. 4(a)), the control unit 10 displays the icon A at a position corresponding to the sweep motion and performs a magnification operation. In magnification operation, the electronic device 1 may execute a first magnification operation and a second magnification operation. The first magnification operation is magnification based on a sweep distance (shift amount), and the second magnification operation is magnification based on a pressure on the icon area.

The upward sweep from the state maintaining the contact in the icon area for triggering execution of the magnification operation involves the first magnification operation. That is, the control unit 10 determines the ratio in proportion to the sweep amount. The display unit 30 displays the image magnified to the determined ratio, as well as the determined ratio M (see FIG. 4(b)).

When the pressure on the icon area is increased while the magnified image is displayed at the ratio corresponding to the sweep amount, the control unit 10 starts the second magnification operation. In second magnification operation, the control unit 10 determines the ratio based on the pressure by using the ratio determined by the first magnification operation as a basis.

For example, the control unit 10 determines the ratio such that the ratio becomes $(150\%)^n$ upon detection of the n-level pressing when the ratio is determined as 150% by the first magnification operation. In FIG. 4(c), third-level pressing is detected and thus the image is magnified to 338%. Or, from the ratio 150% determined by the first magnification operation, the ratio may gradually increase in proportion to the pressure.

Figure 5:
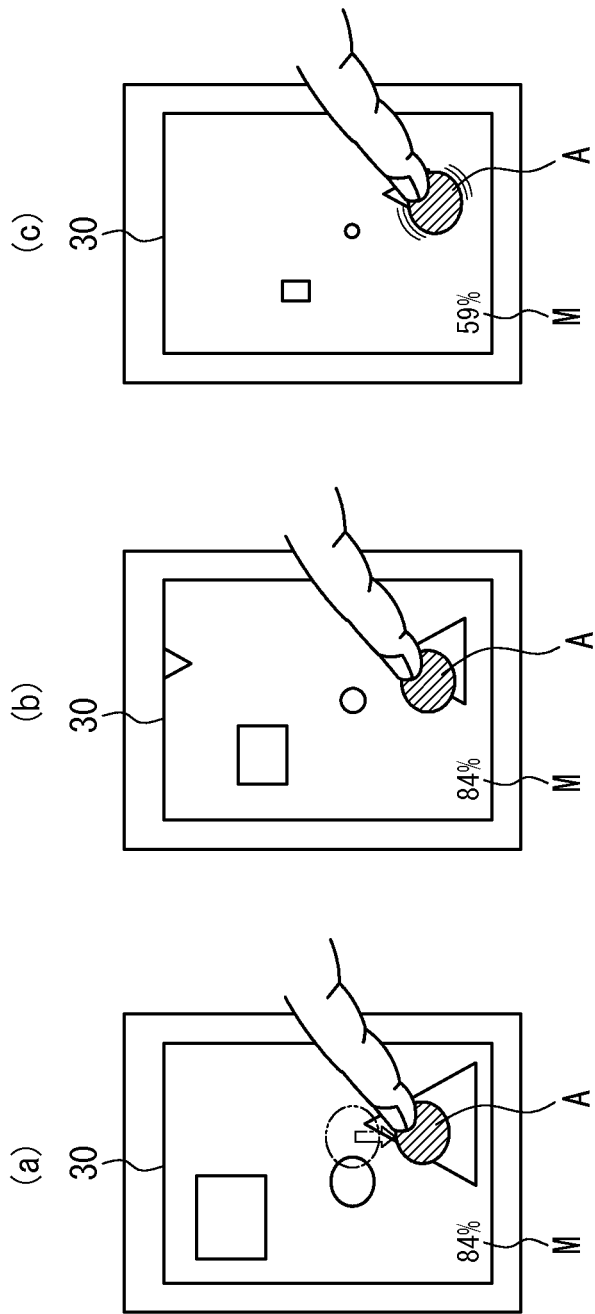
FIGS. 5(a) to 5(c) are diagrams for illustrating a first reduction operation and a second reduction operation according to the first embodiment.

On the other hand, when in zoom mode the contact position is swept downward, for example, while the contact in the icon area is maintained (see FIG. 5(a)), the control unit 10 executes the reduction operation. In reduction operation, the electronic device 1 may execute a first reduction operation and a second reduction operation. The first reduction operation is reduction based on the sweep amount in the icon area, and the second reduction operation is reduction based on the pressure in the icon area.

The downward sweep in the icon area for triggering execution of the reduction operation involves the second reduction operation. That is, when there is downward sweep in the icon area, the control unit 10 determines the ratio in inverse proportion to the sweep amount. The display unit 30 displays the image reduced to the determined ratio as well as the determined ratio M (see FIG. 5(b)).

When the pressure in the icon area is increased while the displayed image is reduced to the ratio corresponding to the sweep amount, the second reduction operation starts. In the second reduction operation, the control unit 10 determines the ratio based on the pressure by using the ratio determined in the first reduction operation as a basis.

For example, the control unit 10 determines the ratio as $(84\%)n$ when the n-level pressing is detected while the ratio is determined as 84% in the first reduction operation. In FIG. 5(c), three-step pressing is detected and thus the image is reduced to 59%. Or, from the ratio at 84% determined in the first reduction operation, the ratio may gradually reduce based on the pressure.

Figure 6:
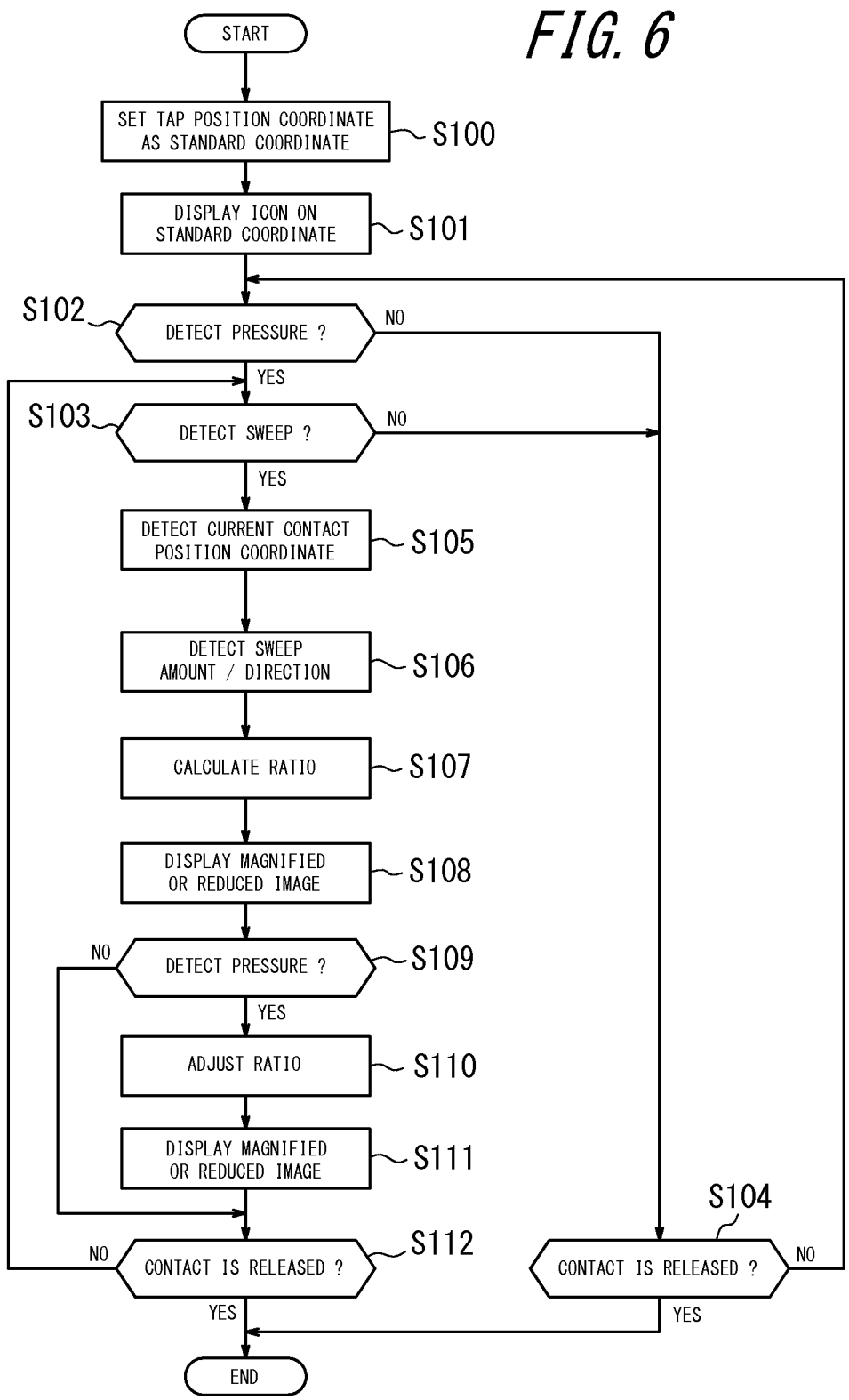
FIG. 6 is a flowchart illustrating a zoom mode operation executed by a control unit according to the first embodiment.

Next, a zoom mode operation executed by the control unit 10 according to the first embodiment will be described with reference to a flowchart in FIG. 6. When the contact is detected while the image that may be magnified or reduced is displayed on the display unit 30, the control unit 10 starts the zoom mode operation.

At step S100, the control unit 10 detects a tap position coordinate on the touch face of the contact detection unit 40 and sets the tap position coordinate as a standard coordinate of the zoom mode. After setting of the standard coordinate, a process proceeds to step S101.

At step S101, the control unit 10 displays the icon A at a position corresponding to the standard coordinate on the display unit 30. After the icon A is displayed, the process proceeds to step S102.

At step S102, the control unit 10 determines whether a pressure is detected in the icon area. When a pressure is detected, the process proceeds to step S103. When a pressure is not detected, the process proceeds to step S104.

At step S103, the control unit 10 determines whether a contact object is sweeping on the touch face. When the contact object is not sweeping, the process proceeds to step S104. When the contact object is sweeping, the process proceeds to step S105.

At step S104, the control unit 10 determines whether the contact in the icon area has been released. When the contact has not been released, the process returns to step S102. When the contact has been released, the zoom mode operation ends.

As described above, at step S105, to which the process proceeds when the sweeping is detected at step S103, the control unit 10 detects a current contact position coordinate on the touch face. After detection of the current contact position coordinate, the process proceeds to step S106.

At step S106, based on the standard coordinate set at step S100 and the current contact position coordinate detected at step S105, the control unit 10 detects the sweep direction and the sweep amount. After detection of the sweep direction and the sweep amount, the process proceeds to step S107.

At step S107, the control unit 10, based on the sweep direction and the sweep amount detected at step S106, calculates the ratio to magnify/reduce the image. After calculation of the ratio, the process proceeds to step S108.

At step S108, the control unit 10 magnifies/reduces the image to the ratio calculated at step S107 and displays the magnified/reduced image on the display unit 30. The control unit 10 also displays the icon A at a position on the display unit 30 corresponding to the current contact position coordinate, as well as a current ratio M on the display unit 30. Steps S103, S105-S108 correspond to the first magnification operation or the first reduction operation. After the magnified/reduced image is displayed, the process proceeds to step S109.

At step S109, the control unit 10 determines whether a pressure in the icon area is detected. When a pressure is detected, the process proceeds to step S110. When a pressure is not detected, the process proceeds to step S112, skipping steps S110 and S111.

At step S110, the control unit 10 detects data based on the pressure detected at step S109. Also, the control unit 10, according to the data based on the pressure, adjusts the ratio calculated at step S107. After adjustment of the ratio, the process proceeds to step S111.

At step S111, the control unit 10 magnifies or reduces the image to the ratio adjusted at step S110 and displays the magnified/reduced image on the display unit 30. The control unit 10 also displays the current ratio M on the display unit 30. Steps S109 to S111 correspond to the second magnification operation or the second reduction operation. After the magnified/reduced image is displayed, the process proceeds to step S112.

At step S112, the control unit 10 determines whether the contact in the icon area has been released. When the contact has not been released, the process returns to step S103. When the contact has been released, the zoom mode operation ends.

The electronic device 1 according to the first embodiment configured as described above may magnify or reduce the image displayed on the display unit 30 at a ratio according to the data based on the pressure detected by the pressure detection unit. Accordingly, the image may be magnified or reduced without the necessity of detecting multi-contact.

Also, the electronic device 1 according to the first embodiment may determine whether to magnify or reduce based on the sweep direction of the contact object on the touch face. Accordingly, the need for an input operation either to a magnification button or a reduction button while the image that may be magnified or reduced is displayed is eliminated, and magnification or reduction may be selected by a simple input operation.

Further, the electronic device 1 according to the first embodiment may execute the first magnification operation and the first reduction operation based on the sweep amount of the contact object on the touch face. Accordingly, by combining the second magnification operation and the second reduction operation according to the data based on the pressure, operability for the operator may be improved. For example, the ratio may be roughly adjusted by the first magnification operation and the first reduction operation and then finely adjusted by the second magnification operation and the second reduction operation.

Next, the electronic device 1 according to a second embodiment of the present invention will be described. A zoom mode operation according to the second embodiment is different from that of the first embodiment. The following is a description of the second embodiment mainly about differences from the first embodiment. Units having the same functions and configurations as those of the first embodiment are provided with the same reference numerals. A configuration of the electronic device 1 according to the second embodiment is the same as that of the first embodiment.

Similarly to the first embodiment, in response to a contact by the operator at any position on the touch face of the contact detection unit 40 while the image to be magnified or reduced is displayed (see FIG. 3(a)), the control unit 10 displays the icon A on the display unit 30 (see FIG. 3(b)).

In response to the pressure in the icon area, the electronic device 1 changes to the zoom mode. Differently from the first embodiment, however, the electronic device 1 changes to the zoom mode regardless of whether the pressing is the first-level pressing. Also differently from the first embodiment, the control unit 10, according to the data based on the pressure to change to the zoom mode, determines the ratio for the first magnification operation or the first reduction operation.

Figure 7:
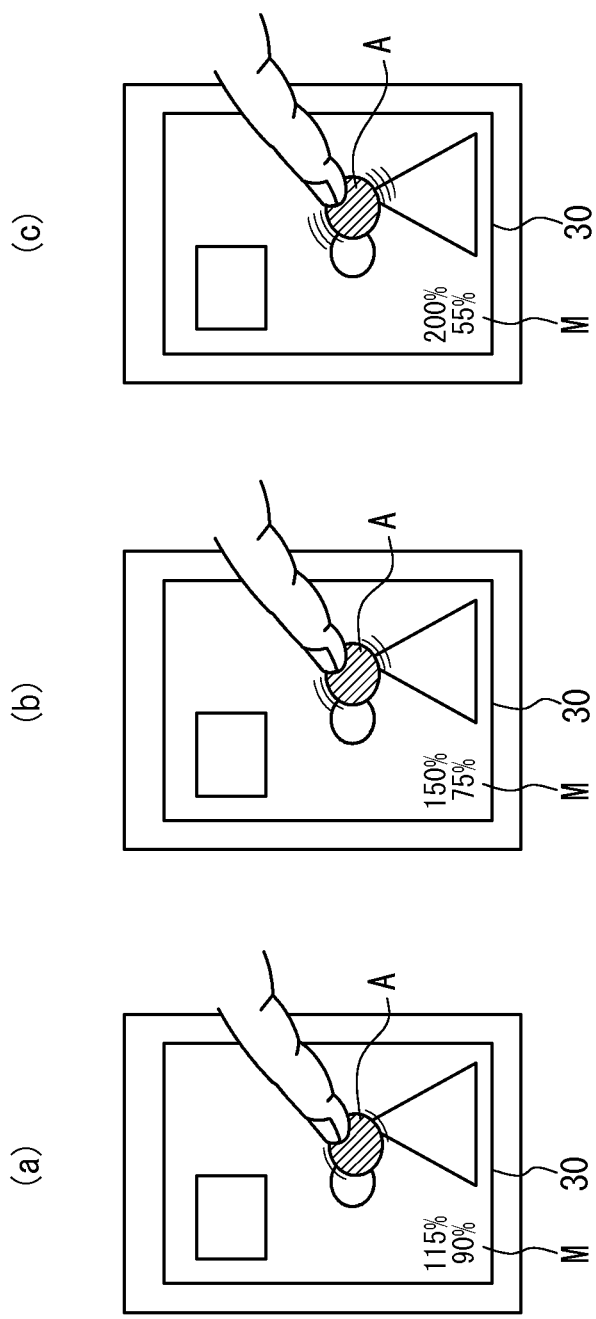
FIGS. 7(a) to 7(c) are diagrams for illustrating a ratio determination method of a first magnification operation and a first reduction operation according to a second embodiment.

For example, when the first-level pressing is detected as illustrated in FIG. 7(a), the control unit 10 determines the ratio as 115% for the first magnification operation and 99% for the first reduction operation. As illustrated in FIG. 7(b), when second-level pressing is detected, the control unit 10 determines the ratio as 150% for the first magnification operation and 75% for the first reduction operation. As illustrated in FIG. 7(c), when the third-level pressing is detected, the control unit 10 determines the ratio as 200% for the first magnification operation and 55% for the first reduction operation. The display unit 30 displays the determined ratio M.

When there is upward sweep in the icon area after the ratios for magnification and for reduction are determined based on the pressure, the control unit 10 confirms execution of the first magnification operation to the ratio according to the data based on the pressure. Further, the control unit 10, by using the ratio of the first magnification operation as a basis, changes the ratio based on the sweep amount.

Figure 8:
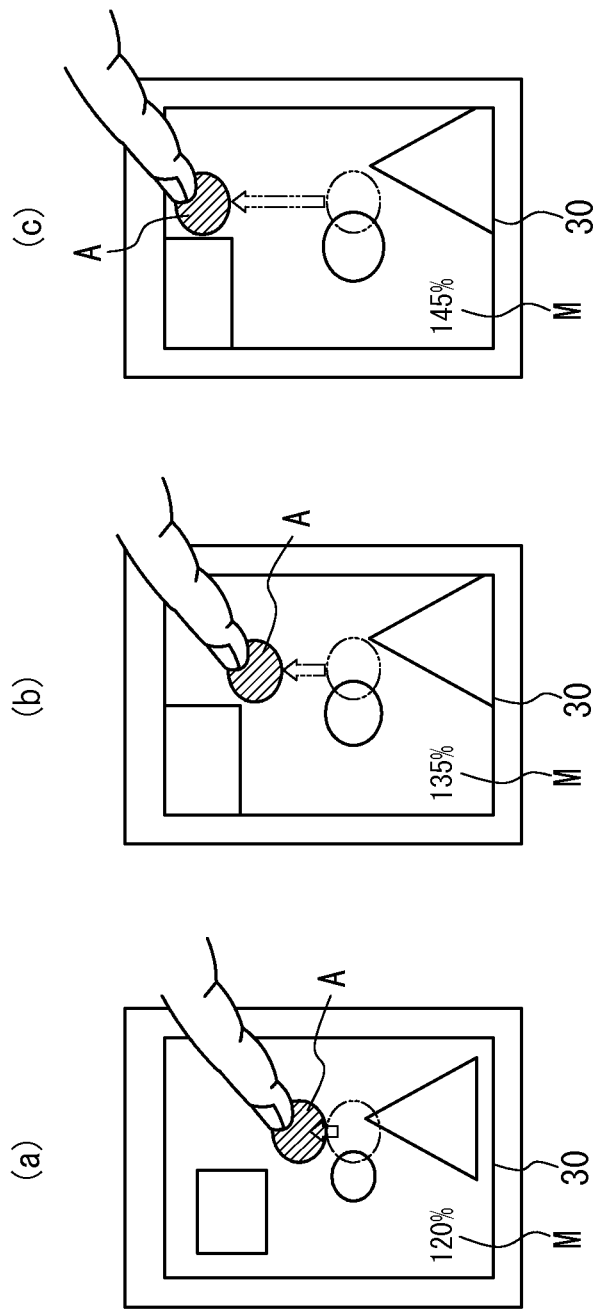
FIGS. 8(a) to 8(c) are diagrams for illustrating a ratio determination method of a second magnification operation according to the second embodiment.

As illustrated in FIG. 8, for example, after confirming execution of the first magnification operation when the first-level pressing is detected, the control unit 10 starts the second magnification operation by using the ratio 115% as a basis. The ratio is determined to increase from the ratio 115% based on the sweep amount. According to the second embodiment also, the control unit 10 ends the zoom mode when the contact is released from the icon area.

On the other hand, when there is downward sweep in the icon area after the ratios of magnification and reduction are determined according to the data based on the pressure, the control unit 10 confirms execution of the first reduction operation to the ratio according to the data based on the pressure. Also, the control unit 10 changes the ratio based on the sweep amount by using the ratio of the first reduction operation as a basis.

Figure 9:
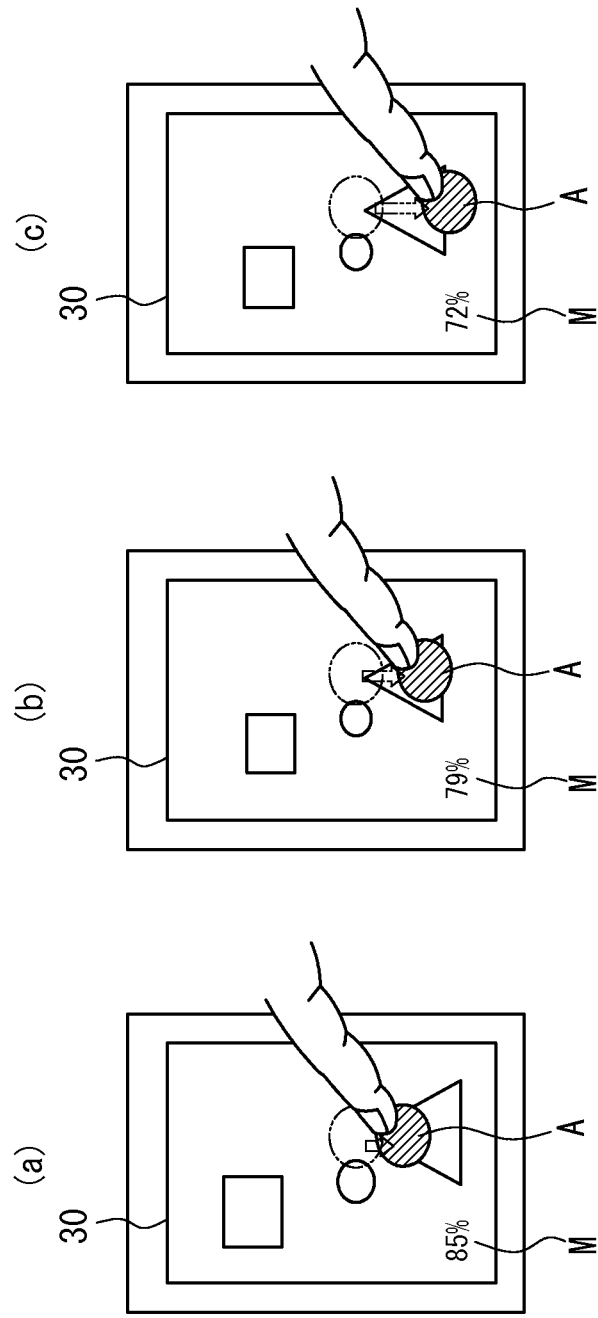
FIGS. 9(a) to 9(c) are diagrams for illustrating the ratio determination method of a second reduction operation according to the second embodiment.

As illustrated in FIG. 9, for example, when the first-level pressing is detected and execution of the first reduction operation is confirmed, the control unit 10 starts the second reduction operation by using the ratio at 90% as a basis. Further, the ratio is determined to be smaller than the ratio 90% based on the sweep amount. According to the second embodiment also, the control unit 10 ends the zoom mode when the contact is released from the icon area.

Figure 10:
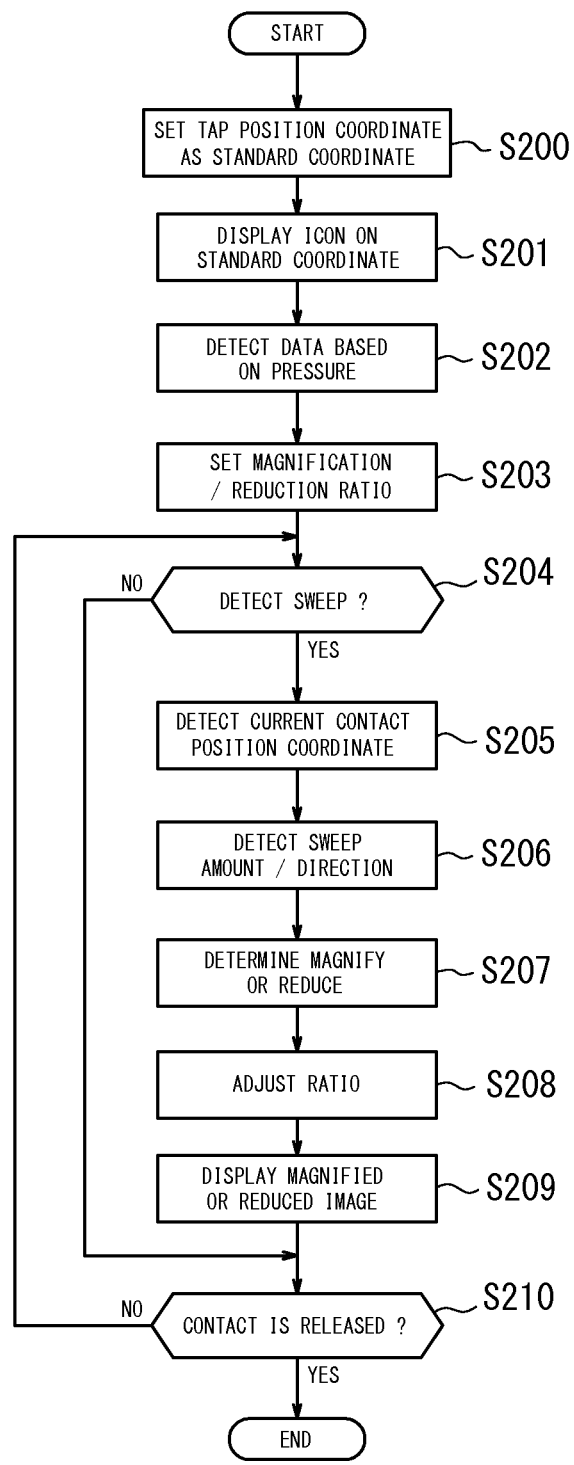
FIG. 10 is a flowchart illustrating a zoom mode operation executed by the control unit according to the second embodiment.
Figure 11:
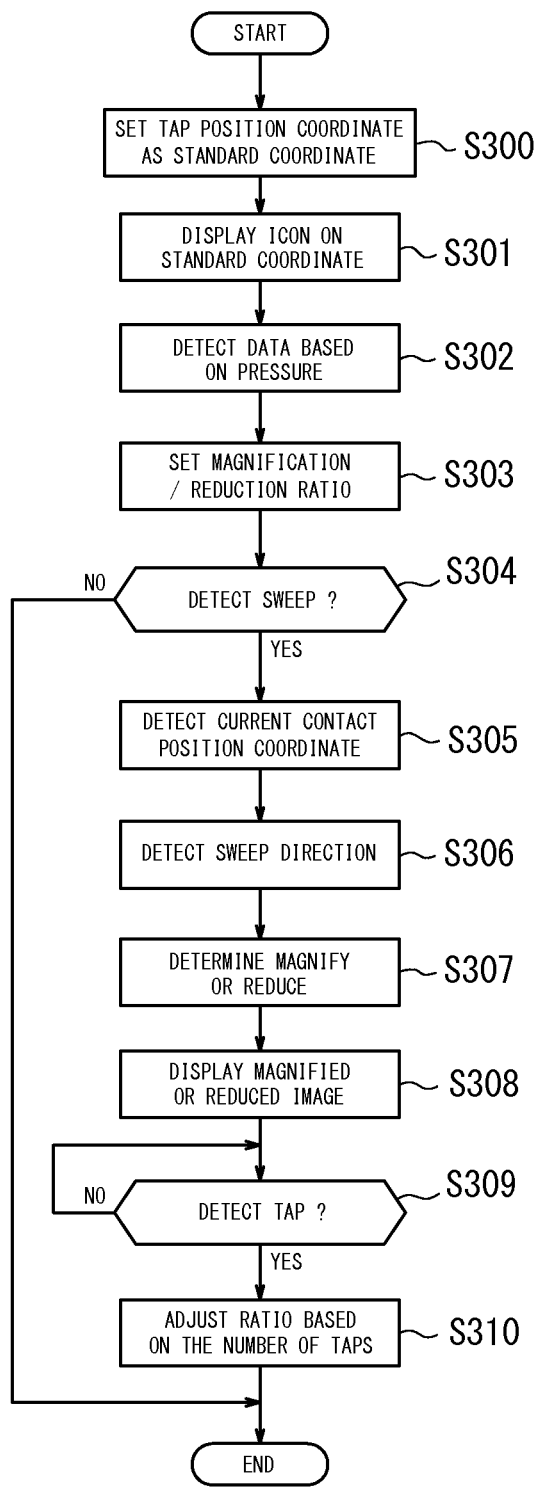
FIG. 11 is a flowchart illustrating a zoom mode operation executed by the control unit according to the third embodiment.

The following is a description of the zoom mode operation executed by the control unit 10 according to the second embodiment with reference to a flowchart in FIG. 10. When the pressure is detected while the image that may be magnified or reduced is displayed on the display unit 30, the control unit 10 starts the zoom mode operation.

At steps S200 and S201, the control unit 10 performs the same control as that at steps S100 and S101 of the first embodiment, respectively.

At step S202, the control unit 10 detects the data based on the pressure in the icon area. After detection of the data based on the pressure, a process proceeds to step S203.

At step S203, the control unit 10 determines a magnification ratio and a reduction ratio according to the data based on the pressure. The magnification ratio and the reduction ratio according to the data based on the pressure are preliminarily stored in the memory unit 80 to be retrieved by the control unit 10. After setting of the magnification ratio and the reduction ratio, the process proceeds to step S204.

At step S204, the control unit 10 determines whether the contact object is sweeping on the touch face. When the contact object is sweeping, the process proceeds to step S205. When the contact object is not sweeping, the process proceeds to step S210, skipping steps S205 to S209.

At step S205, the control unit 10 detects the current contact position coordinate on the touch face. After detection of the current contact position coordinate, the process proceeds to step S206.

At step S206, the control unit 10 detects the sweep direction and the sweep amount based on the standard coordinate set at step S200 and the current contact position coordinate detected at step S205. After detection of the sweep direction and the sweep amount, the process proceeds to step S207.

At step S207, the control unit 10 determines whether to perform the magnification operation or the reduction operation based on the sweep direction. When the control unit 10 determines to perform the magnification operation, the control unit 10 sets the magnification ratio set at step S203 as the standard ratio. On the other hand, when the control unit 10 determines to perform the reduction operation, the control unit 10 sets the reduction ratio set at step S203 as the standard ratio. Steps S202 to S207 correspond to the first magnification operation or the first reduction operation. After determination on the operation to be executed, the process proceeds to step S208.

At step S208, the control unit 10, based on the sweep amount detected at step S206, adjusts the standard ratio set at step S207. After adjustment of the standard ratio, the process proceeds to step S209.

At step S209, the control unit 10 magnifies or reduces the image to the ratio adjusted at step S209 and displays the magnified/reduced image on the display unit 30. The control unit 10 also displays the current ratio M on the display unit 30. Steps S204 to S209 correspond to the second magnification operation or the second reduction operation. After the magnified/reduced image is displayed, the process proceeds to step S210.

At step S210, the control unit 10 determines whether the contact in the icon area has been released. When the contact has not been released, the process returns to step S204. When the contact has been released, the zoom mode operation ends.

The electronic device 1 according to the second embodiment having the configuration stated above also may magnify or reduce the image displayed on the display unit 30 to the ratio according to the data based on the pressure detected by the pressure detection unit 60. Moreover, according to the second embodiment also, whether to magnify or reduce may be determined based on the sweep direction of the contact object on the touch face. Further, according to the second embodiment also, the first magnification operation and the first reduction operation may be executed based on the sweep amount of the contact object on the touch face.

Next, the electronic device 1 according to a third embodiment of the present invention will be described. A zoom mode operation according to the third embodiment is different from that of the second embodiment. The following is a description of the third embodiment mainly about differences from the second embodiment. Units having the same functions and configurations as those of the second embodiment are provided with the same reference numerals. A configuration of the electronic device 1 according to the third embodiment is the same as that of the second embodiment.

Figure 3:
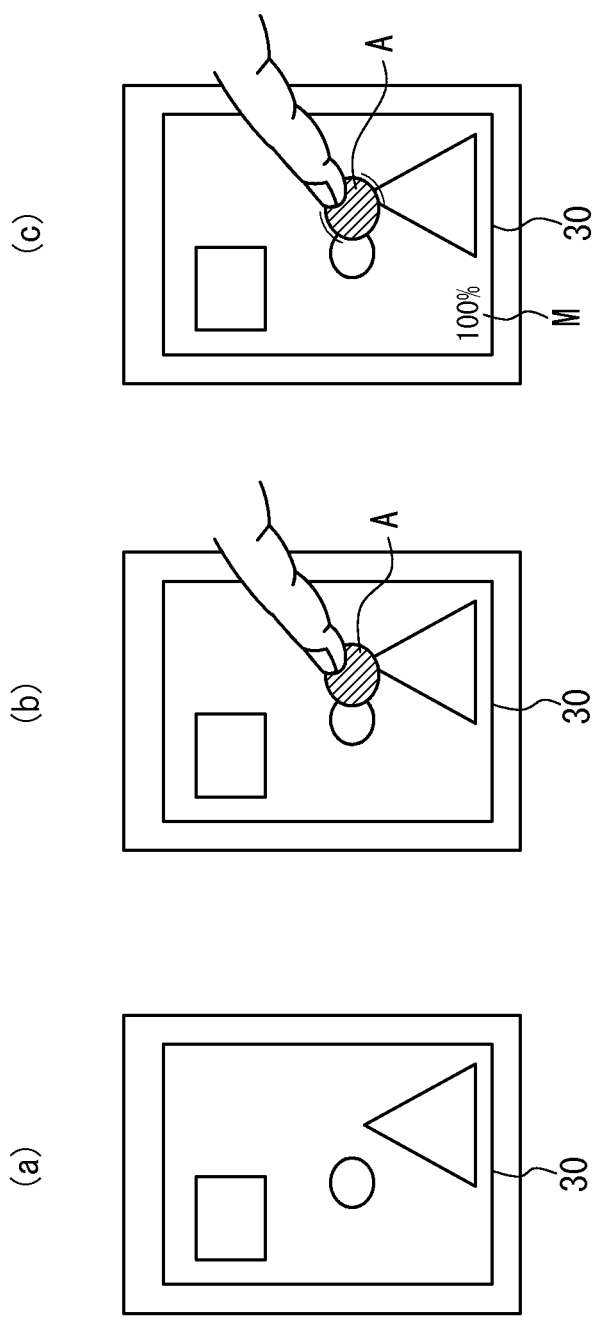
FIGS. 3(a) to 3(c) are diagrams for illustrating a method to change the electronic device to a zoom mode according to the first embodiment.

Similarly to the second embodiment, when the operator contacts at any position on the touch face of the contact detection unit 40 while the image to be magnified or reduced is displayed (see FIG. 3(*a*)), the control unit 10 displays the icon A on the display unit 30 (see FIG. 3(*b*)).

In response to the pressure in the icon area, the electronic device 1 changes to the zoom mode. However, in the same manner as the second embodiment, the electronic device 1 changes to the zoom mode regardless of whether the pressing is the first-level pressing. Also in the same manner as the second embodiment, the control unit 10, according to the data based on the pressure to change to the zoom mode, determines the ratios for magnification and reduction.

According to the third embodiment, when there is upward sweep in the icon area after the icon A is pressed, the first magnification operation is executed. In the first magnification operation, the displayed image is magnified to the ratio determined based on the pressure. On the other hand, when there is downward sweep in the icon area after the icon area is pressed, the first reduction operation is executed. In the first reduction operation, the displayed image is reduced to the ratio determined based on the pressure. In a manner different from the second embodiment, the ratio is not changed based on the sweep amount in the icon area.

When a tap in the icon area is detected while the first magnification operation or the first reduction operation is executed, the control unit 10, based on the number of taps, executes the second magnification operation or the second reduction operation. In the first magnification operation and the second reduction operation, the control unit 10 adjusts the ratios from an original magnification ratio and an original reduction ratio, respectively.

For example, when the standard ratio determined based on the pressure is 115%, the control unit 10 increases the ratio by 5% per one tap. When the standard ratio determined based on the pressure is 90%, the control unit 10 reduces the ratio by 5% per one tap. The control unit 10, based on the adjusted ratio, further magnifies or reduces the image and displays the magnified/reduced image on the display unit 30.

The following is a description of the zoom mode operation executed by the control unit 10 according to the third embodiment with reference to a flowchart in FIG. 10. When the pressure is detected while the image that may be magnified or reduced is displayed on the display unit 30, the control unit 10 starts the zoom mode operation.

From step S300 to step S303, the control unit 10 executes the same control as that from step S200 to step S203 according to the second embodiment.

At step S304, the control unit 10 determines whether the contact object is sweeping on the touch face. When the contact object is sweeping, a process proceeds to step S305. When the contact object is not sweeping, the zoom mode operation ends.

At step S305, the control unit 10 detects the current contact position coordinate on the touch face. After detection of the current contact position coordinate, the process proceeds to step S306.

At step S306, the control unit 10 detects the sweep direction based on the standard coordinate set at step S200 and the current contact position coordinate detected at step S205. In a manner different from the second embodiment, the control unit 10 does not detect the sweep amount. After detection of the sweep direction, the process proceeds to step S307.

At step S307, the control unit 10 determines whether to perform the magnification operation or the reduction operation based on the sweep direction. When the control unit 10 determines to perform the magnification operation, the control unit 10 sets the magnification ratio set at step S303 as the standard ratio. On the other hand, when the control unit 10 determines to perform the reduction operation, the control unit 10 sets the reduction ratio set at step S303 as the standard ratio. Steps S302 to S307 correspond to the first magnification operation or the first reduction operation. After determination on the operation to be executed, the process proceeds to step S308.

At step S308, the control unit 10 magnifies or reduces the image to the ratio set at step S307 and displays the magnified/reduced image on the display unit 30. The control unit 10 also displays the current ratio on the display unit 30. After the magnified/reduced image is displayed, the process proceeds to step S309.

At step S309, the control unit 10 determines whether a tap on the touch face has been detected. When a tap has not been detected, the process returns to step S309. When a tap has been detected, the process proceeds to step S310.

At step S310, the control unit 10 adjusts the standard ratio based on the number of taps. Also, the control unit 10 magnifies or reduces the image to the adjusted standard ratio and displays the magnified/reduced image on the display unit 30. After the magnified/reduced image is displayed, the zoom mode operation ends.

Steps S309 and S310 correspond to the first magnification operation or the first reduction operation.

The electronic device 1 according to the third embodiment having the configuration stated above also may magnify or reduce the image displayed on the display unit 30 to the ratio according to the data based on the pressure detected by the pressure detection unit 60. Moreover, according to the third embodiment also, whether to magnify or reduce may be determined based on the sweep direction of the contact object on the touch face.

Further, according to the third embodiment, the magnification ratio or the reduction ratio of the image may be adjusted based on the number of taps. Accordingly, by combining the magnification operation and the reduction operation according to the data based on the pressure, operability for the operator may be improved. For example, the ratio may be roughly adjusted by the magnification operation and the reduction operation based on the pressure and then finely adjusted based on the number of taps.

The following is a description of the electronic device 1 according to a fourth embodiment of the present invention. A zoom mode operation according to the fourth embodiment is different from that of the third embodiment. The following is a description of the fourth embodiment mainly about differences from the third embodiment. Units having similar functions and configurations to those of the third embodiment are provided with the same reference numerals. A configuration of the electronic device 1 according to the fourth embodiment is similar to that of the third embodiment.

Similarly to the third embodiment, when the operator contacts at any position on the touch face of the contact detection unit 40 while the image to be magnified or reduced is displayed (see FIG. 3(a)), the control unit 10 displays the icon A on the display unit 30 (see FIG. 3(b)).

Figure 12:
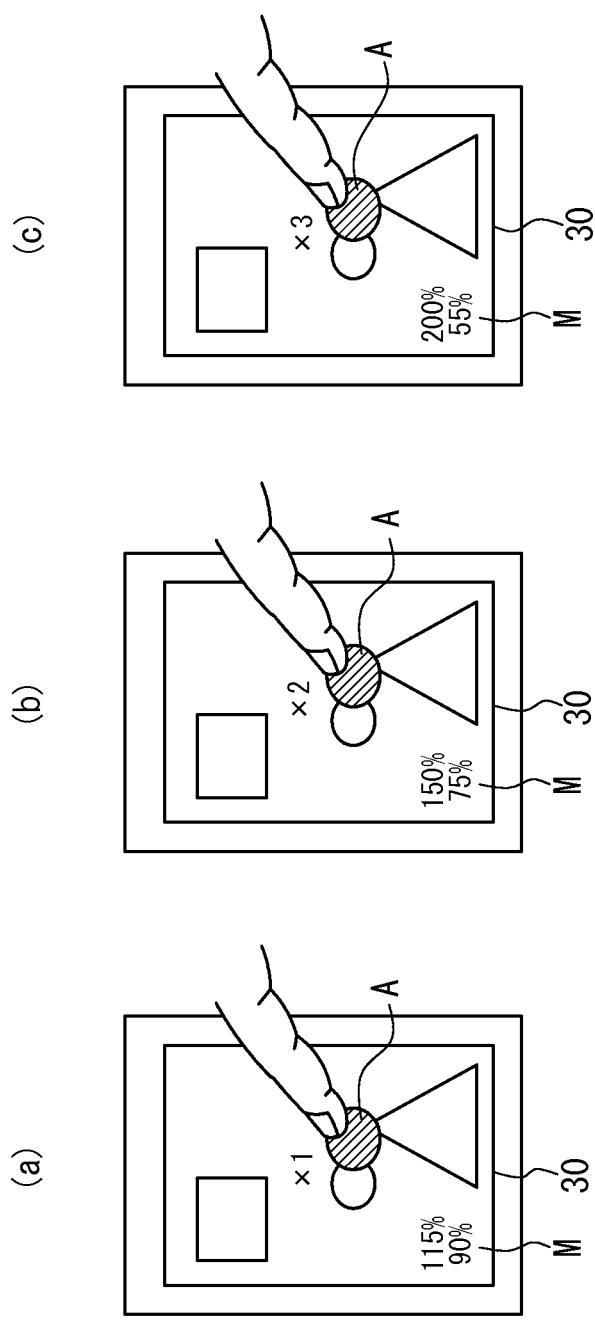
FIGS. 12(a) to 12(c) are diagrams for illustrating a ratio determination method of a first magnification operation and a first reduction operation according to a fourth embodiment.

When the contact is released from the icon area and the touch face is tapped, the electronic device 1 changes to the zoom mode. After changing to the zoom mode, the control unit 10, based on the number of taps in the icon area, determines the magnification ratio and the reduction ratio (see FIG. 12).

After the tap in the icon area, when there is upward sweep in the icon area, the first magnification operation is executed. In the first magnification operation, the displayed image is magnified to the magnification ratio determined based on the number of taps. On the other hand, when there is downward sweep in the icon area after the tap in the icon area, the first reduction operation is executed. In the first reduction operation, the displayed image is reduced to the reduction ratio determined based on the number of taps. The ratios are not changed based on the sweep amount in the icon area.

After execution of the first magnification operation or the first reduction operation, when the icon area is pressed, the control unit 10 executes the second magnification operation or the second reduction operation according to the data based on the pressure. In the first magnification operation and the second reduction operation, the ratios are adjusted from the original magnification ratio and the original reduction ratio, respectively. When the pressure in the icon area is released, that is, when the contact is released, the control unit 10 further magnifies or reduces the image to the adjusted ratio and displays the magnified/reduced image on the display unit 30.

Figure 13:
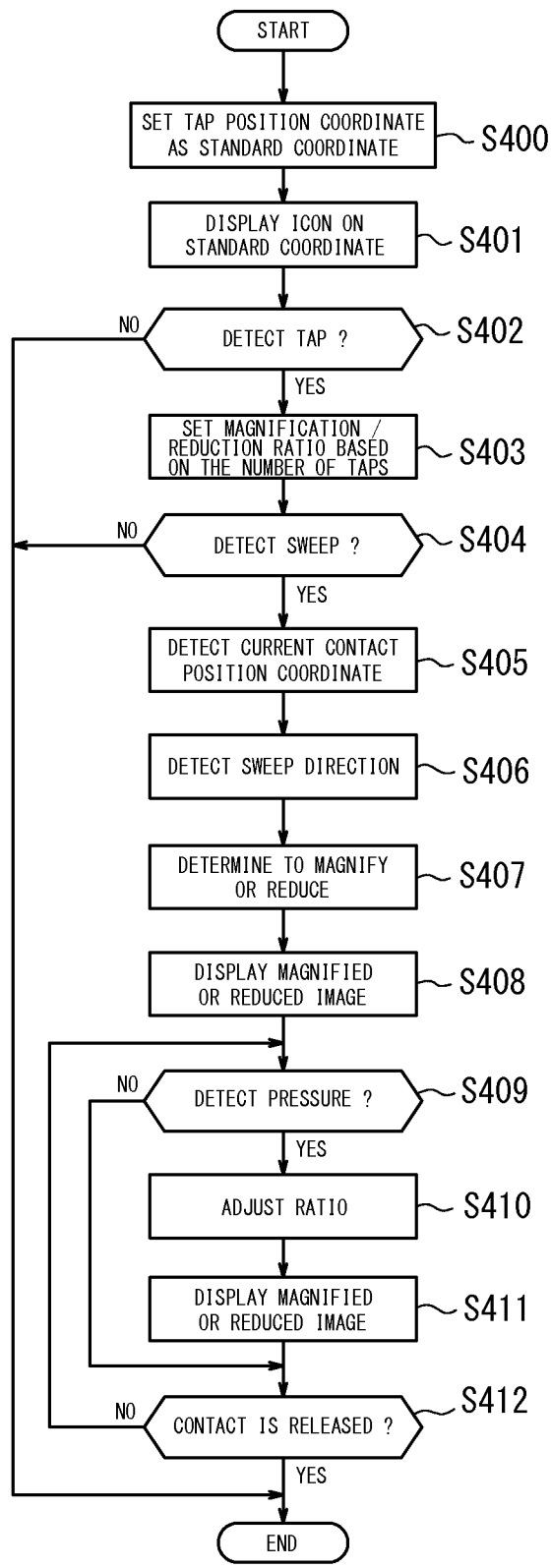
FIG. 13 is a flowchart illustrating a zoom mode operation executed by the control unit according to the fourth embodiment.

The following is a description of the zoom mode operation executed by the control unit 10 according to the fourth embodiment with reference to a flowchart in FIG. 13. When the pressure is detected while the image that may be magnified or reduced is displayed on the display unit 30, the control unit 10 starts the zoom mode operation.

At steps S400 and S401, the control unit 10 executes the same control as that at steps S300 and S301 according to the third embodiment.

At step S402, the control unit 10 determines whether a tap in the icon area has been detected. When a tap has been detected, the process proceeds to step S403. When a tap has not been detected, the zoom mode operation ends.

At step S403, the control unit 10 determines the magnification ratio and the reduction ratio based on the number of taps. After setting of the ratios, the process proceeds to step S404.

From step S404 to step S408, the control unit 10 executes the same control as that from step S304 to step S408 according to the third embodiment. Steps S402 to S408 correspond to the first magnification operation or the first reduction operation.

At step S409, the control unit 10 determines whether the icon area is pressed. When pressing is detected, the process proceeds to step S410. When pressing is not detected, the process proceeds to step S412, skipping steps S410 and S411.

At step S410, the control unit 10 adjusts the standard ratio according to the data based on the pressure. After adjustment of the standard ratio, the process proceeds to step S411.

At step S411, the control unit 10 magnifies or reduces the image to the standard ratio adjusted at step S410 and displays the magnified/reduced image on the display unit 30. Steps S409 to S411 correspond to the second magnification operation or the second reduction operation. After the magnified/reduced image is displayed on the display unit 30, the process proceeds to step S412.

At step S412, the control unit 10 determines whether the contact has been released from the icon area. When the contact has not been released, the process returns to step S409. When the contact has been released, the zoom mode operation ends.

The electronic device 1 according to the fourth embodiment having the configuration stated above also may magnify or reduce the image displayed on the display unit 30 to the ratio according to the data based on the pressure detected by the pressure detection unit 60. Moreover, according to the fourth embodiment also, whether to magnify or reduce may be determined based on the sweep direction of the contact object on the touch face. Further, according to the fourth embodiment also, the magnification ratio or the reduction ratio of the image may be set based on the number of taps.

It is to be understood that those who are skilled in the art may easily vary or alter in a multiple manner based on this disclosure. Accordingly, such variation and alteration are included in a scope of the present invention.

According to the first to fourth embodiments, for example, although magnification and reduction of the image are determined based on the sweep direction, whether to magnify or reduce the image may be determined by another method. Or, only one of magnification and reduction may be enabled. When an image that may be either magnified or reduced is displayed, the image may be magnified or reduced without the necessity of determination between magnification and reduction.

According to the first to fourth embodiments, also, although the image is magnified when there is upward sweep and reduced when there is downward sweep, the direction for determining between magnification and reduction is not limited to the upward direction and the downward direction.

According to the first and second embodiments, moreover, although the ratio is determined based on the sweep amount, the ratio may be determined based on other information among various information about the sweep, instead of the sweep amount. For example, the ratio may be determined based on other information such as sweep speed, sweep acceleration and the like.

According to the first to fourth embodiments, further, the electronic device 1 is exemplified as a mobile phone terminal, however, the electronic device 1 is applicable also to various devices for performing predetermined operations based on an input to the contact detection unit such as the touch panel.

What is claimed is:

1. An electronic device comprising:
   a display configured to display an image;
   a pressure detection unit configured to detect a pressure;
   a contact detection unit comprising a touch face, the contact detection unit being configured to detect a contact of an object at any position on the touch face; and
   a controller configured to perform magnification or reduction of the image around the contact and control a ratio thereof step by step, based on the pressure detected by the pressure detection unit,
   wherein the control of the ratio thereof step by step comprises detecting a sweep amount or a sweep direction, calculating a first ratio used for a first magnification or reduction and calculating a second ratio used for a second magnification or reduction by adjusting the first ratio, and one of the first ratio and the second ratio is calculated based on the pressure, and the other of the first ratio and the second ratio is calculated based on the sweep amount or the sweep direction,
   wherein the object is a single object, and
   wherein the magnification or reduction is performed with the single object.

2. A display method comprising steps of:
   displaying an image;
   detecting a pressure;
   detecting a contact of an object at any position on a touch face; and
   performing magnification or reduction of the image around the contact and controlling a ratio thereof step by step, based on the detected pressure of the contact,
   wherein the controlling of the ratio thereof step by step comprises detecting a sweep amount or a sweep direction, calculating a first ratio used for a first magnification or reduction and calculating a second ratio used for a second magnification or reduction by adjusting the first ratio, and one of the first ratio and the second ratio is calculated based on the pressure, and the other of the first ratio and the second ratio is calculated based on the sweep amount or the sweep direction,
   wherein the object is a single object, and
   wherein the magnification or reduction is performed with the single object.

* * * * *